United States Patent
Fujikami et al.

(10) Patent No.: US 6,552,260 B2
(45) Date of Patent: Apr. 22, 2003

(54) SUPERCONDUCTING CABLE AND METHOD OF ANALYZING THE SAME

(75) Inventors: Jun Fujikami, Osaka (JP); Toru Okazaki, Osaka (JP); Takato Masuda, Osaka (JP); Takeshi Kato, Osaka (JP); Hiroyasu Yumura, Osaka (JP); Yoshihisa Takahashi, Yokohama (JP); Kimiyoshi Matsuo, Yokohama (JP); Shoichi Honjo, Yokohama (JP); Tomoo Mimura, Yokohama (JP)

(73) Assignees: Sumitomo Electric Industries, Ltd., Osaki (JP); Tokyo Electric Power Company, Tokyo (JP)

( * ) Notice: Subject to any disclaimer, the term of this patent is extended or adjusted under 35 U.S.C. 154(b) by 0 days.

(21) Appl. No.: 09/758,261

(22) Filed: Jan. 12, 2001

(65) Prior Publication Data
US 2001/0054509 A1 Dec. 27, 2001

(30) Foreign Application Priority Data

Jan. 13, 2000 (JP) ........................ 2000-005106
Jan. 13, 2000 (JP) ........................ 2000-005107
Aug. 24, 2000 (JP) ........................ 2000-254561
Aug. 24, 2000 (JP) ........................ 2000-254564

(51) Int. Cl.$^7$ ............................................. H01B 12/02
(52) U.S. Cl. .................. 174/15.4; 174/125.1; 29/599; 505/230; 505/231
(58) Field of Search ................ 174/15.4, 125.1; 505/230, 231, 880, 879, 430; 29/599, 685; 257/661

(56) References Cited

U.S. PATENT DOCUMENTS

| | | | | |
|---|---|---|---|---|
| 3,730,966 A | | 5/1973 | Aupoix et al. ............ 174/15 C |
| 5,932,523 A | * | 8/1999 | Fujikami ..................... 505/231 |
| 5,952,614 A | | 9/1999 | Ries ........................ 174/106 R |
| 6,005,194 A | | 12/1999 | Ries ........................ 174/125.1 |
| 6,215,072 B1 | * | 4/2001 | Fujikami ................. 174/125.1 |
| 6,271,474 B1 | * | 8/2001 | Fujikami ................. 174/125.1 |
| 6,313,408 B1 | * | 11/2001 | Fujikami ................. 174/125.1 |

FOREIGN PATENT DOCUMENTS

| | | |
|---|---|---|
| JP | 29-6685 | 10/1954 |
| JP | 11-506261 | 6/1999 |
| WO | WO 00/49626 | 8/2000 |

OTHER PUBLICATIONS

Yukikazu Iwasa, "Case Studies in Superconducting Magnets", (Design and Operational Issues), Plenum Press, New York, 5 pages, 1994.

* cited by examiner

*Primary Examiner*—Albert W. Paladini
(74) *Attorney, Agent, or Firm*—Foley & Lardner

(57) ABSTRACT

A superconducting cable includes a core material, conductor layers formed by means of helically winding superconducting wires around the core material, electrically insulating layers, and magnetic shielding layers formed by means of helically winding superconducting wires around each of the electrically shielding layers. The superconducting wire is wound at the shortest pitch on the outermost conductor layer and is wound at the longest pitch on the outermost magnetic shielding layer.

19 Claims, 10 Drawing Sheets

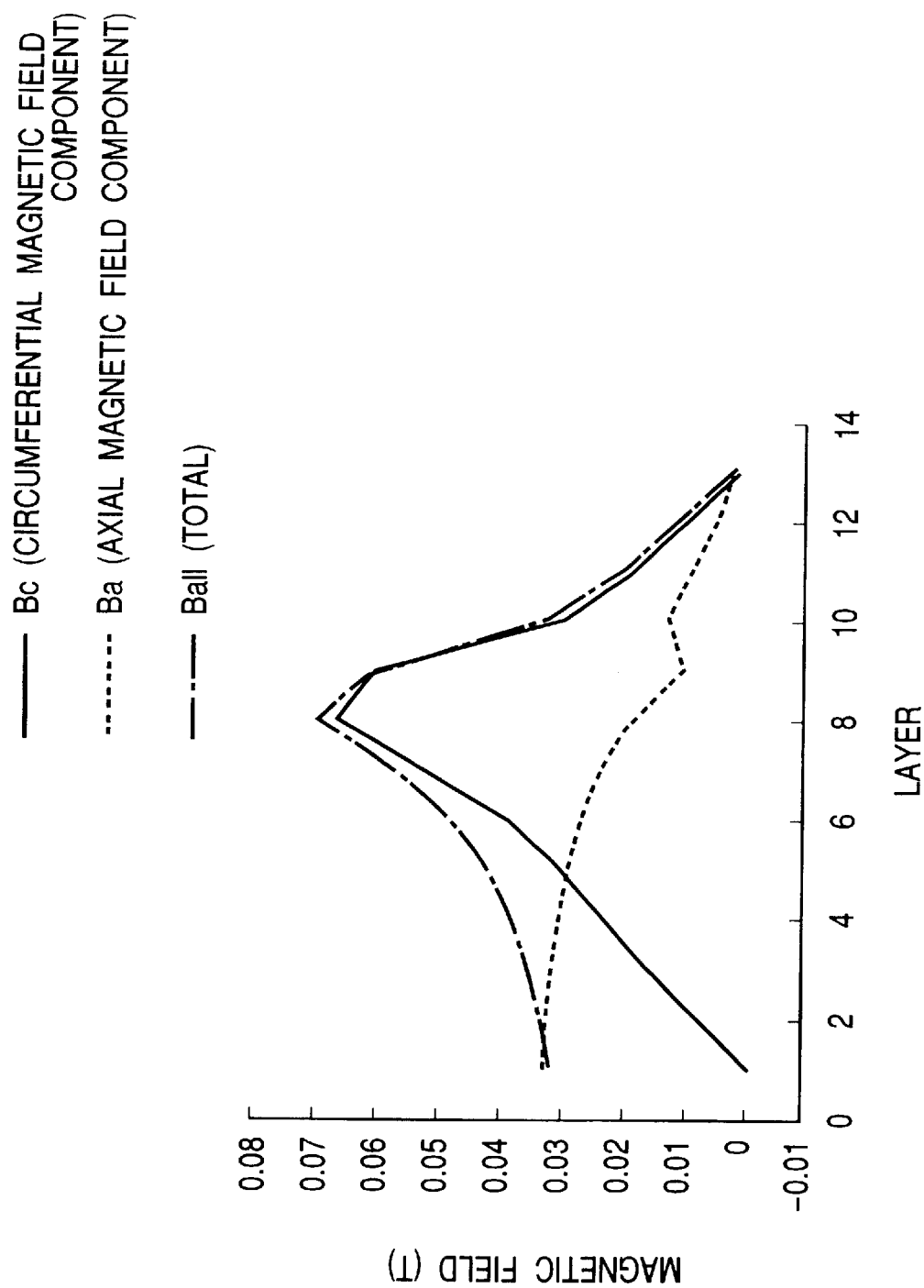

SUPERCONDUCTING CABLE AND METHOD OF ANALYZING THE SAME

BACKGROUND OF THE INVENTION

1. Field of the Invention

The present invention relates to a superconducting cable. More particularly, the present invention relates to a superconducting cable which comprises a core material, a multilayer superconducting conductor, and a magnetic shielding layer, and in which AC (alternating current) losses are reduced by means of analysis of current distribution within the superconducting cable.

The present invention also relates to a method of analyzing the current distribution within a superconducting cable. More particularly, the present invention relates to a method of analyzing the current distribution within a superconducting cable which comprises a core material, a multilayer superconducting conductor, and a magnetic shielding layer to calculate accurately AC losses of the superconducting cable.

2. Description of the Related Art

There has already been known a superconducting conductor which is formed into a multilayer construction by means of helically winding a tape-shaped superconducting wire around a core material at a constant pitch. Such a superconducting conductor suffers from a problem called "unbalanced current distribution." Specifically, the further inward a superconducting layer, the smaller a current density. In contrast, the further outward a superconducting layer, the greater a current density. AC losses are thought to increase with an increase in unbalanced current distribution. Hence, a decrease in AC losses has been sought.

The invention described in Japanese Patent Examined Publication No. Sho. 29-6685 has been known as a basic technique pertaining to a reduction in the unbalanced current distribution of a multilayer conductor and a decrease in AC losses of the same. The invention relates to a technique of adjusting impedance of each layer by means of controlling a pitch at which the wires are helically wound in each layer. Further, Published Japanese National Stage of International Application No. Hei. 11-506261 describes the construction of a superconducting cable having a magnetic shielding layer which is formed by winding a superconducting wire.

In connection with a superconducting conductor, there has not yet been established a specific procedure for controlling a winding pitch because of the following reasons. A current-voltage characteristic of a superconducting conductor is nonlinear, and the effective resistance of the superconducting conductor is changed by an electric current flowing through the superconducting conductor. Without consideration of these factors, the current distribution and AC losses of the superconducting conductor cannot be predicted. Further, a specific method of taking into consideration the effective resistance has not yet been established.

Moreover, there has not yet been established a method of analyzing the current distribution and AC losses of a superconducting conductor in consideration of a core material and a superconducting magnetic shielding layer. The reason for this is that an equivalent circuit into which a high-temperature superconducting conductor is to be modeled has not yet been established.

An AC-loss characteristic of a superconducting conductor including a core material and a magnetic shielding layer has not been made definite experimentally. A theoretical model considering the resistance and impedance of the core material has not yet been reported. One of the reasons for this is that numerical computation considering the resistance and impedance of the core material becomes very complex.

SUMMARY OF THE INVENTION

It is therefore a first object of the invention to provide a superconducting cable; particularly, a superconducting cable which comprises a core material and a multilayer superconducting conductor, and in which AC losses are reduced by means of accurate analysis of current distribution within the superconducting cable.

Further, it is a second object of the invention to provide a method of analyzing accurately current distribution within the superconducting cable; particularly, a superconducting cable which comprises a core material and a multilayer superconducting conductor to calculate AC losses of the superconducting cable.

The present invention is based on the finding that an AC loss arising in a cable has a minimum value not when electric currents in the respective layers are made uniform, but when electric currents flowing through wires of a conductor layer are made uniform. Hence, the first object of the present invention is achieved by means of optimizing a pitch at which a superconducting wire of a conductor layer is to be wound and a pitch at which a superconducting wire of a magnetic shielding layer is to be wound.

More specially, the cable according to the first aspect of the present invention is a superconducting cable which comprises a core material; conductor layers formed by means of helically winding superconducting wires around the core material; electrically insulating layers; and magnetic shielding layers formed by means of helically winding superconducting wires around the electrically insulating layer.

Through processes (1)–(4) provided below, electric currents flowing through the conductor layers and the magnetic shielding layers are analyzed, and a pitch of the conductor layers and a pitch of the magnetic shielding layers are set on the basis of the result of analysis of electric currents flowing through the conductor layers and the magnetic shielding layers.

(1) A process of modeling the core material, the conductor layers, and the magnetic shielding layers (for the occasion that has arisen) as a circuit including at least induced reactance.

(2) A process of inputting parameters including specifications of the core material, including the size and specific resistance thereof; specifications of the superconducting wire, including a critical current (hereinafter abbreviated "Ic") and size thereof; specifications of the conductor layers, including the direction and pitch at which the superconducting wires are to be helically wound, the thicknesses and outer diameters of the conductor layers, and the number of conductor layers; and frequencies and electric currents to be supplied.

(3) A process of computing the inductance and effective resistance of the circuit through use of the inputted parameters.

(4) A process of preparing a circuit formula on the basis of the model and computing the current distribution within each of the layers.

Preferably, the pitch of the superconducting wires including the magnetic shielding layer (that is; the pitch of the conductor layer and the pitch of the magnetic shielding layer) is set such that the absolute value of the analyzed current falls within a range of ±30% with reference to value $I_{all}/n_c$ obtained by means of dividing the current $I_{all}$, which is provided to the conductor layer with a predetermined value, by the number of wires "$n_c$" used for constituting the conductor layer. More preferably, the absolute value of the analyzed current falls within a range of ±20% with reference to value $I_{all}/n_c$, and more preferably within a range of ±5% with reference to value $I_{all}/n_c$. In a case where respective layers are formed from substantially the same number of wires; for example, a case where the conductor is formed from a smaller number of layers, an AC loss can have minimum value by means of making electric currents flowing through the respective layers uniform. Even when the layers differ from each other in critical current (Ic) because of a magnetic field or the influence of deflection associated with helical winding of a wire, the analysis by way of the four processes (1) through (4) can be performed by means of defining the critical current (Ic) of the wires for each layer.

The second object of the present invention is achieved by means of modeling a core material and a conductor layer into a suitable equivalent circuit and further modeling a magnetic shielding layer for the occasion that has arisen More specially, the method according to the second aspect of the present invention is a method of analyzing the current distribution of the superconducting cable which comprises a core material; conductor layers formed by means of helically winding superconducting wires around the core material; and electrically insulating layers. This method comprises the processes (1)–(4) provided below.

(1) A process of modeling the core material and the conductor layers as a circuit including at least induced reactance.

(2) A process of inputting parameters including specifications of the core material, including the size and specific resistance thereof; specifications of the superconducting wire, including a critical current (hereinafter abbreviated "Ic") and size thereof; specifications of the conductor layers, including the direction and pitch at which the superconducting wires are to be helically wound, the thicknesses and outer diameters of the conductor layers, and the number of conductor layers; and frequencies and electric currents to be supplied.

(3) A process of computing the inductance and effective resistance of the circuit through use of the inputted parameters.

(4) A process of preparing a circuit formula on the basis of the model and computing the current distribution within each of the layers.

Here, a superconducting cable which is an object of analysis may be (a) a superconducting cable which has conductor layers formed by means of winding superconducting wires around a core material and does not have any magnetic shielding layer or (b) a superconducting cable which has conductor layers formed by means of winding superconducting wires around a core material and magnetic shielding layers formed by means of winding a superconducting wire on each of the conductor layers. No particular limitation is imposed on the number of conductor layers and the number of magnetic shielding layers. In view of a necessity for making a superconducting cable compatible with "modeling" to be described later, adjacent layers of the conductor layers and the magnetic shielding layers each having the superconducting wires are preferably insulated each other. In a case where consideration is given to control of impedance of each layer in superconducting conductor, modeling of conductors in which layers are insulated each other to completely obviate migrating resistance between layers is easier than modeling of conductors in which layers are not insulated each other. Further, provision of conductors in which layers are insulated each other is also effective for reducing an eddy current loss arising in the conductors.

In the modeling process (1), a core material, conductor layers, and magnetic shielding layers may be modeled as a circuit formed from solely induced reactance and, more preferably, are modeled as a circuit formed from resistance and induced reactance. Analysis of current distribution taking into consideration resistance has hitherto been considered to be very complicated and difficult. However, through use of the "modeling" method and the "technique of computing induced reactance and effective resistance of a modeled circuit" according to the present invention, a current distribution could be analyzed correctly in consideration of resistance. Further, an AC-loss characteristic of a conductor can be analyzed on the basis of the result of analysis.

Modeling processes will be described in more detail. A core material and conductor layers are deemed a concentrated-constant circuit comprising induced reactance connected in series with resistance. Moreover, magnetic shielding layers are deemed a closed circuit loop formed by means of interconnecting the magnetic shielding layers by way of resistors provided at terminals thereof. A circuit constituted of the conductor layers and a power supply connected thereto is deemed a primary circuit. A circuit constituted of the magnetic shielding layers and terminals provided at the terminals thereof is deemed a secondary circuit. Preferably, a mutual-induction circuit is formed from the primary and secondary circuits.

In order to determine a current distribution of the superconducting cable based on the thus-modeled equivalent circuit, there must be set parameters required by the modeled equivalent circuit for computing inductance and effective resistance.

Parameter settings are as follows: specifications of a wire (width, thickness, and Ic); specifications of a core material (specific resistance, outer diameter, and thickness); specifications of a conductor layer and a magnetic shielding layer (the winding direction and the pitch of each layer, the outer diameter of each layer, the thickness of each layer, and the Ic maintenance factor of each layer); and energizing requirements (an electric current supplied, and the frequency of the electric current).

In a case where respective layers differ in terms of Ic, the critical current and size of a superconducting wire may set for each of the layers.

Preferably, at the time of computation of effective resistance, the resistance of the concentrated-constant circuit is handled as being changed by an electric current flowing through the conductor layers. One property of a high-temperature superconducting conductor is that the superconducting conductor gently changes from a superconducting state to a normal conductive state. For instance, a DC flow characteristic of a high-temperature superconducting conductor is taken as an example. A current-voltage curve of the high-temperature superconducting conductor assumes V~ to $I^n$ (n to 10). In contrast with an ideal superconducting conductor, a finite voltage will not arise in a stepped manner (i.e., in a discontinuous manner) at I=Ic.

If the high-temperature superconducting cable having such a non-linear current-voltage characteristic is taken as having current-independent resistance, as is the case with a normal conductor, or if the resistance of the high-temperature superconducting cable is taken as zero at a value below Ic, as is the case with an ideal superconducting wire, a discrepancy will arise between a model and an actual superconducting cable.

An AC loss arising in a superconducting cable can be handled more strictly by taking into consideration resistance which changes with an electric current.

One of the most important characteristics of a high-temperature superconducting cable is that an electric current which exceeds the critical current (Ic) safely flows through the superconducting cable without involvement of a quenching phenomenon, which would arise in a related art metal-based superconducting wire. From a comparison between an AC loss arising in a conductor whose pitch has been adjusted and an AC loss arising in another conductor which is identical in capacitance with the conductor and whose pitch has not been adjusted, the greatest difference is predicted to arise between the conductors in the vicinity of Ic.

Thus, prediction of an AC-loss characteristic of a high-temperature superconducting cable at electric currents greater than Ic of the conductor and at an electric current ranging in the vicinity of Ic also becomes important for analyzing the high-temperature superconducting cable. The effect of prediction of an AC-loss characteristic can be taken into a model, by means of considering the resistance of a modeled concentrated-constant circuit being changed by an electric current.

More specifically, the effective resistance $R_{eff}$ of a superconducting wire is defined as $R_{eff}=W_{layer}/I^2$ in terms of an AC loss $W_{layer}$ of each layer and an electric current I flowing through the layer. Further, $R_{eff}$ is deemed the resistance of the concentrated-constant circuit. Preferably, the AC loss $W_{layer}$ is computed from an AC current-loss characteristic of the superconducting wire. For instance, the AC loss $W_{layer}$ can be computed through use of Norris' equation. Further, an equation for computing the AC loss $W_{layer}$ at I>Ic is made continuous with the equation for defining the AC loss $W_{layer}$ at I<Ic.

Subsequently, a circuit formula corresponding to the model is prepared, and the current distribution of each of the layers is computed. At this time, an appropriate initial value is inputted as an electric current of each of the layers during the process for inputting parameters, and the current distribution within each of the layers is computed from the initial value.

Through use of the thus-computed electric current, process (2) for inputting parameters through process (4) for computing a current distribution is repeated. Repetition of processing is performed until a difference in the electric current of each of the layers before computation and the electric current of each of the layers after computation falls within a desired range.

The desired range into which the computation result is to fall is 10% or less, more preferably 5% or less, and much more preferably 1% or less. If the difference between the electric current of each layer defined before computation and the electric current of the each layer obtained after computation exceeds 10%, the accuracy of an analysis result is deteriorated. If the difference between the electric current of each layer defined before computation and the electric current of the each layer obtained after computation can be converged to a range of about 1%, further repetition of computation will end in consumption of time and will contribute little to an improvement in the accuracy of an analysis result. Hence, if the current distribution of each layer is determined, an electric current flowing through a wire can be readily estimated on the basis of the current flowing through a corresponding layer.

More preferably, the modeling process further has a process for determining a magnetic field distribution from the thus-computed current distribution, thereby computing an AC loss.

A superconducting cable which reduces an AC loss determined by way of the foregoing process is embodied as a superconducting cable comprising a core material, conductor layers formed by means of helically winding superconducting wires around the core material, an electrically insulating layer, and magnetic shielding layers formed by means of helically winding superconducting wires around the electrically insulating layer, wherein the superconducting wire is wound at the shortest pitch on the outermost conductor layer and is wound at the longest pitch on the outermost magnetic shielding layer.

Preferably, the shortest pitch at which the superconducting wire is to be wound on the conductor layer satisfies an equation provided below. If the shortest pitch satisfies the equation, deterioration owing to deflection of a superconducting wire can be suppressed, and there can be provided a superconducting cable which involves a large critical current and a small AC loss.

$$\varepsilon_c = \sqrt{\frac{P_n^2 + (\pi^2(D_{n-1} + 2t))^2}{P_n^2 + (\pi^2(D_{n-1} + t))^2}} - 1$$

where $\varepsilon_c$ denotes the critical deflection of a superconducting wire; $P_n$ denotes a pitch (m) at which the superconducting wire of the $n^{th}$ layer is to be wound; "t" denotes the thickness (m) of the superconducting wire; and $D_n$ denotes the outer diameter (m) of the $n^{th}$ layer.

It is also desirable that the longest pitch at which the superconducting wire is to be wound on the magnetic shielding layer satisfies an equation provided below. If the longest pitch satisfies the equation, deterioration owing to tension of a superconducting wire can be suppressed, and there can be provided a superconducting cable which involves a large critical current and a small AC loss.

Rupture load of a superconducting wire>(frictional force (kg/m)×the length (m) of a superconducting wire for a half pitch)+tensile force for winding (kg).

Preferably, a circumferential magnetic field component and an axial magnetic field component of each of the layers are analyzed by way of processes (1) through (4), and the pitch of each of the superconducting wires including the magnetic shielding layers is set such that the circumferential magnetic field component is distributed so as to have only one maximal value when viewed from an inner layer to an outer layer and that the axial magnetic field component has the pattern of monotonously-decreasing distribution when viewed from an inner layer to an outer layer. As a result, even in a case where variations in $I_{all}/n_c$ fail to fall within a range of 5%, there can be obtained a superconducting conductor whose pitch is set so as to reduce an AC loss.

BRIEF DESCRIPTION OF THE DRAWINGS

FIG. 11 is a graph showing magnetic field distribution of each of layers when a pitch at which the superconducting wire is to be wound around the outermost conductor layer is set to 130 mm.

DETAILED DESCRIPTION OF THE PREFERRED EMBODIMENTS

An embodiment of the present invention will be described hereinbelow.

Test Example 1

Prior to explanation of construction of a superconducting cable according to the present invention, there will be described an analysis method which enables correct analysis of AC losses of a superconducting cable. The superconducting cable according to the present invention is formed on the basis of the result of analysis performed according to the analysis method.

There will be computed AC losses of a three-phase superconducting cable comprising a core material, conductor layers formed by means of winding a superconducting wire onto the core material to form a multilayer construction, an insulating layer formed on the outermost conductor layer, and magnetic shielding layers formed by winding a superconducting wire onto the insulating layer to form a multilayer construction. Procedures for computing AC losses comprise the steps of: modeling a superconducting cable as an equivalent circuit; deriving the inductance and effective resistance of the superconducting cable; deriving a circuit equation corresponding to a modeled equivalent circuit; computing the current distribution of the superconducting cable; determining the distribution of magnetic field from the current distribution; and computing AC losses.

Modeling

Figure 1:
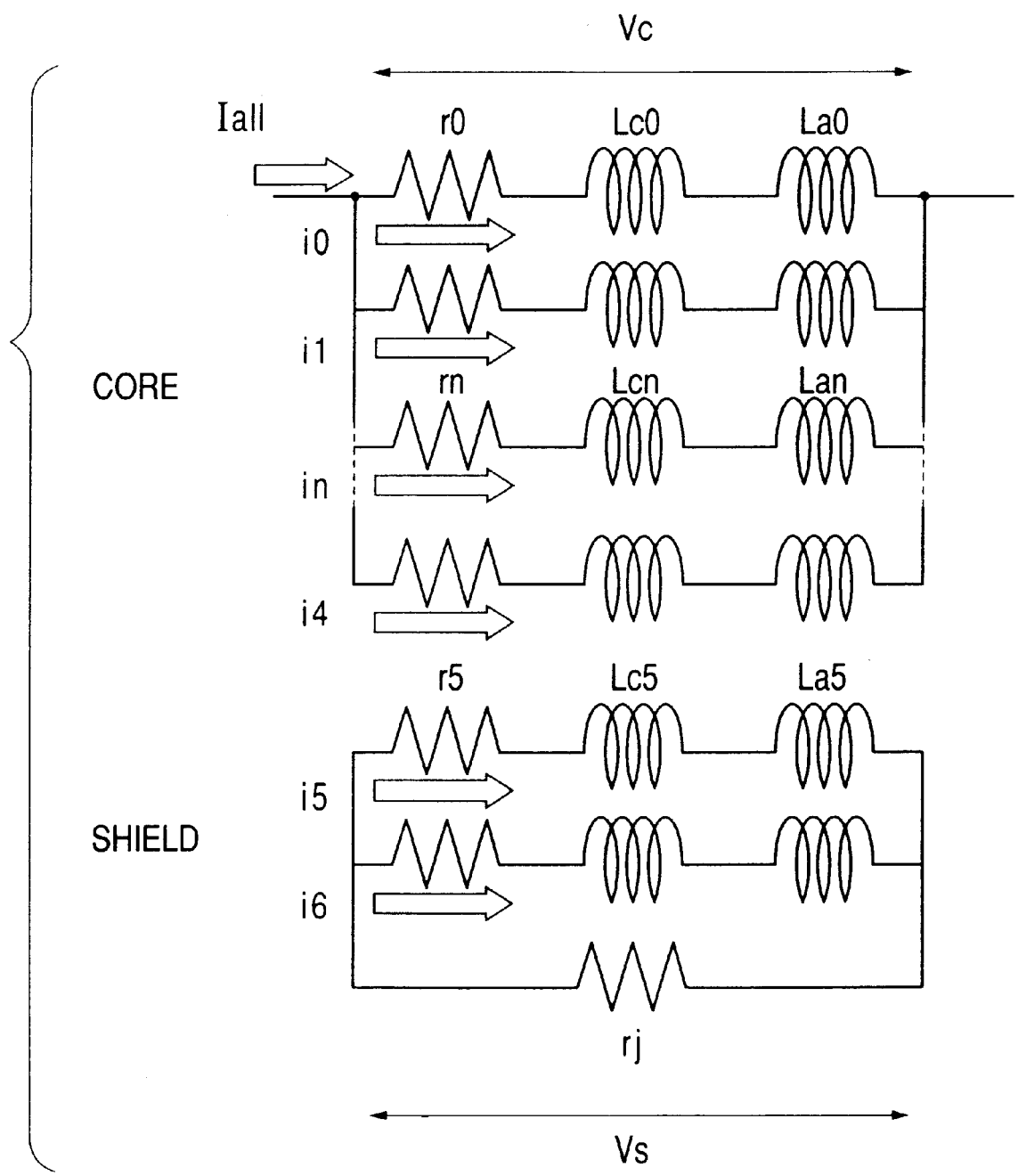
FIG. 1 is a descriptive illustration showing a technique for modeling a superconducting cable as an equivalent circuit.

Attention is paid to one of three-phase cables, and a superconducting cable comprising a core material, conductor layers (core), magnetic shielding layers (shield), and a terminal is modeled as an equivalent circuit shown in FIG. 1. More specifically, the core material and the conductor layer are modeled as a concentrated-constant circuit which is formed by means of connecting induced reactance in series with a resistor. $I_{all}$ is supplied to the conductor layer from an external power supply, and the conductor layers are insulated from each other.

In the magnetic shielding layer, the end of a superconducting wire is connected to a connection resistor $r_j$, thereby constituting a loop such as that shown in FIG. 1. In the drawing, $i_0, i_1 \ldots i_6$ designate electric currents flowing through respective layers; $L_{c0}, L_{c1} \ldots L_{c6}$ denote inductance of the respective layers induced by a circumferential magnetic field; $L_{a0}, L_{a1} \ldots L_{a6}$ designate inductance of the respective layers induced by an axial magnetic field; $r_0$, $r_1 \ldots r_6$ designate effective resistances of the respective layers; $r_j$ designates the inductance and resistance of the terminal; $V_c$ designates the voltages of the conductor layers; and $V_s$ designates the voltages of the magnetic shielding layers. A numerical subscript of 0 denotes a core material. Further, conductor layers and magnetic shielding layers are sequentially denoted with subscripts 1,2,3, . . . from the innermost layer. In this model, four conductor layers and two magnetic shielding layers are employed.

Derivation of Inductance

In connection with the inductance of each of the superconducting layers (i.e., the conductor layer and the magnetic shielding layer), a circumferential component is defined as Eq. 1 in consideration of mutual inductance between layers, and an axial component is defined as Eq. 2 in consideration of the same.

$$L_{cn,m} = \frac{\mu_0}{2\pi}\ln\left(\frac{a_s}{a_{\max}}\right) \quad \text{Eq. 1}$$

$$a_{\max} = \max(a_n, a_m)$$

wherein $a_s$ denotes the radius of a magnetic shielding layer (outermost layer); $a_n$ denotes the radius of the $n^{th}$ layer; and $a_m$ denotes the radius of the $m^{th}$ layer (predicted on the assumption that the thickness of a layer<<the radius of the layer).

$$L_{an,m} = (-1)^k \frac{\mu_0 \pi a_{\min}^2}{P_n P_m} \quad \text{Eq. 2}$$

$$a_{\min} = \min(a_n, a_m)$$

where $a_n$ denotes the radius of the $n^{th}$ layer, and $P_n$ denotes a pitch at the $n^{th}$ layer. Here, in a case where the $n^{th}$ layer and the $m^{th}$ layer have same direction winding, "k" assumes a value of 1. In a case where the $n^{th}$ layer and the $m^{th}$ layer have different direction winding, "k" assumes a value of 2.

Derivation of a Resistance Component

A resistance component of each layer is derived from a theoretical AC loss $W_{norris}$ (Norris' Equation) of a wire constituting a conductor layer. At this time, an effective resistance $r_{wire}$ of a wire is defined as Eq. 3 in terms of an electric current $I_{wire}$ flowing through the wire.

$$r_{wire} = \frac{W_{Norris}}{I_{wire}^2} \quad \text{Eq. 3}$$

Here, provided that $z = I_{wire}/I_c$, the loss $W_{norris}$ of the wire at $z < 1$ (less than critical current) is derived from Norris' equation as represented by Eq. 4.

$$W_{Norris} = \frac{\mu_0 f I_c^2}{\pi}\left\{(1-z)\ln(1-z) + z - \frac{z^2}{2}\right\} \quad \text{Eq. 4}$$

When $z > 1$, a flux throw loss is expressed by Eq. 5.

$$W_{Norris} = \left(\frac{0.5 \cdot \mu_0 f I_c^2}{\pi}\right) \cdot Z^n \quad \text{Eq. 5}$$

Here, "n" represents an exponent value fitted the current-voltage curve to power law model. Eq. 5 is derived from Eq. 4 when $z = 1$. Equations 4 and 5 show close agreement with test results.

The resistance of a terminal (i.e., $3 \times 10^{-6}$ Ω/cable length) determined through a test is adopted as a joint resistance.

Circuit Equation

A circuit equation of this model is expressed as shown below.

$$V_c = (j\omega(L_{c00} + L_{a00}) + r_0)i_0 + j\omega(L_{c01} + L_{a01})i_1 + \ldots j\omega(L_{c06} + L_{a06})i_6 \quad \text{Eq. 6}$$

$$V_c = j\omega(L_{c10} + L_{a10})i_0 + (j\omega(L_{c11} + L_{a11}) + r_1) + \ldots j\omega(L_{c16} + L_{a16})i_6$$

$$\vdots$$

$$V_s = j\omega(L_{c60} + L_{a60})i_0 + j\omega(L_{c61} + L_{a61})i_1 + \ldots (j\omega(L_{c66} + L_{a66}) + r_6)i_6$$

$$V_s = -r_j(i_5 + i_6)$$

$$I_{all} = \sum_{i=0-4} i_i$$

Supposing that in the above equation pitches of respective layers, $L_c$, $L_a$, $r_j$, and $I_{all}$, are set as initial conditions, Eq. 6 becomes a set of nonary simultaneous equations concerning $i_0$ through $i_6$, $V_c$, and $V_s$. Thus, the current distribution of each of the superconducting layers can be computed.

Computation of Current Distribution

An initial current distribution (current of each of the layers) is suitably provided to the total current ($I_{all}$). The resistance of each of the superconducting layers is determined through the resistance component derivation process. As a result, all numerals exclusive of $i_i$, $V_c$, and $V_s$ in Eq. 6 become known. Therefore, $i_0$ through $i_6$, $V_c$, and $V_s$ can be computed by means of solving Eq. 6. After the resistance of each of the superconducting layers has again been determined on the basis of a corresponding current value thus computed, currents $i_0$ through $i_6$ are computed by Eq. 6. These operations are iterated until a difference between computation results before and after computation becomes equal to or less than a given value. In this example, when the difference between computation results has become equal to or less than 1%, computation was deemed completed.

The current distribution of a superconducting cable must be determined by means of solving the circuit equations represented by Eq. 6. In fact, a change in the resistance of a circuit, which would be induced by a current, must be taken into consideration. Hence, an answer cannot be determined analytically. The current distribution within a superconducting cable formed by means of arbitrary winding pitch cannot be predicted by means of computation before there is adopted a technique of "iterating operations until a difference between computation results before and after computation becomes equal to or less than a given value." The current distribution of the superconducting cable can be predicted at a point in time processing pertaining to the above-described processes has been performed. Hence, the AC loss is determined from the resultant current distribution through the following processes.

Computation of Magnetic Field

Figure 2:
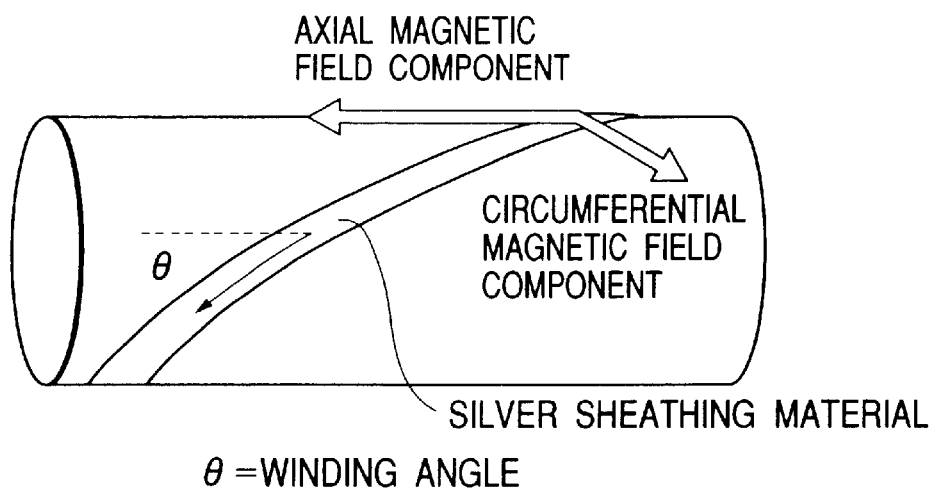
FIG. 2 is a descriptive illustration showing a magnetic field component which appears in a superconducting cable when an electric current flows through the cable.

In this model, the conductor layer is formed by means of helically winding a plurality of superconducting wires. As shown in FIG. 2, the magnetic field developing during energization can be divided into a component in the circumferential direction of the conductor (hereinafter called a "circumferential field component") and a component in the axial direction of the conductor (hereinafter called an "axial field component").

The circumferential field component $H_{cn}$ (A/m) applied to the $n^{th}$ layer is expressed by Eq. 7.

$$H_{cn} = \frac{1}{2\pi R_n} \sum_{i=0}^{n-1} i_i \quad \text{Eq. 7}$$

In the case that the total number of layer is six, the axial field component $H_{an}$ (A/m) applied to the $n^{th}$ layer is expressed by Eq. 8.

$$H_{an} = \sum_{i=n+1}^{6} \left(\frac{1}{P_i}\right)i_i \quad \text{Eq. 8}$$

Computation of AC Loss

Figure 3:
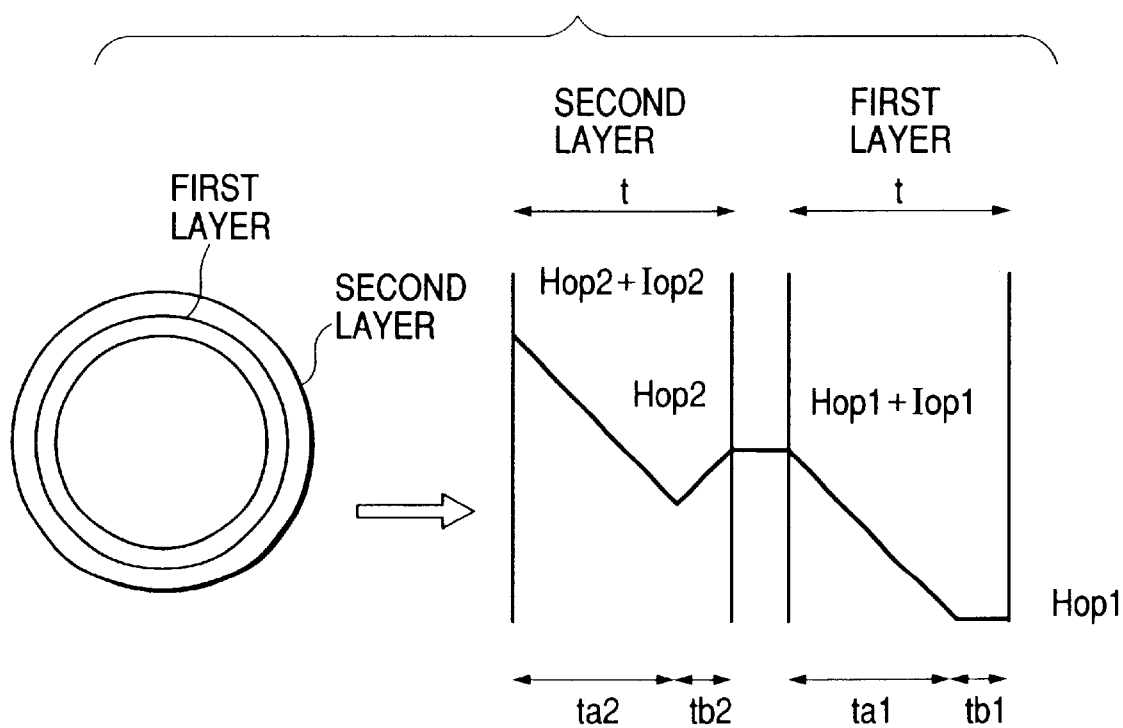
FIG. 3 is a descriptive illustration showing a technique for modeling a cylindrical conductor as an infinite plane.

AC losses of conductors are computed by means of modeling conductors as adjacent "n" infinite planes such as those shown in FIG. 3. Such a model has been proposed, for example, by H. ISHII (ISS' 97 proceedings). Such a model is convenient for representing the magnetic field distribution of a cylindrical conductor.

A magnetization loss of the conductor is assumed to be equal to a total sum of magnetization losses of respective layers.

A magnetization loss of each of the layers can be expressed by means of utilization of equations (Eqs. 9 and 10) of a magnetization loss of a superconducting flat plate based on the Bean model.

$$W = \frac{2\mu_0 f H_m^3}{3 J_c} \quad \text{Eq. 9}$$

$$W = 2\mu_0 f J_c \cdot t \cdot H_m \left(1 - \frac{2 j_c \cdot t}{3 H_m}\right) \quad \text{Eq. 10}$$

Here, Eq. 9 is directed toward a case where a magnetic field does not penetrate the entire flat plate, and Eq. 10 is directed toward a case where a magnetic field penetrates through the entire flat plate. Here, the equations are based on the premise that a magnetic field uniformly penetrates the flat plate from both sides. Here, "f" denotes a frequency (Hz); $H_m$ denotes a peak value of an external magnetic field (A/m); $J_c$ denotes a critical current density (A/m$^2$) of a superconducting conductor; and "t" denotes the thickness (m) of the flat plate.

As in the case of the superconducting flat plate, Equations 9 and 10 may differ in terms of whether (1) a magnetic field does not penetrate through the entire layer of the superconducting conductor or (2) a magnetic field penetrates through the entire layer. In case (1), Eq. 9 is defined as Eq. 11. Alternatively, in case (2), Eq. 10 is defined as Eq. 12.

$$W_n = \left\{\frac{2\mu_0 f H_{opn}^3}{3 J_e} + \frac{2\mu_0 f (H_{opn} + I_{opn})^3}{3 J_e}\right\} \cdot (2\pi R_n) \quad \text{Eq. 11}$$

$$W_n = 2\mu_0 f \cdot J_c \quad \text{Eq. 12}$$

$$\left\{ t_{bn}^2 \left( H_{opn} - \frac{2 J_e \cdot t_{bn}}{3} \right) + t_{an}^2 \left( H_{opn} + I_{opn} - \frac{2 J_c \cdot t_{an}}{3} \right) \right\} \cdot (2\pi R_n)$$

$H_{opn}$ denotes the magnitude of a magnetic field which is induced in the $n^{th}$ layer by the electric current flowing through layers other than the $n^{th}$ layer (i.e., an external magnetic field for the $n^{th}$ layer). $I_{opn}$ denotes the magnitude of a magnetic field induced by an electric current flowing through the $n^{th}$ layer (the magnetic field of the $n^{th}$ layer). $H_{opn}$ is expressed as Eq. 13 in terms of a circumferential field component $H_{cn}$ of the $n^{th}$ layer and an axial field component $H_{an}$ of the $n^{th}$ layer.

$$H_{opn} = \sqrt{|H_{cn}|^2 + |H_{an}|^2} \quad \text{Eq. 13}$$

$I_{opn}$ is expressed as Eq. 14 in terms of an electric current $i_n$ flowing through the $n^{th}$ layer.

$$I_{opn} = \frac{|i_n|}{2\pi R_n} \quad \text{Eq. 14}$$

$H_{opn}$ and $I_{opn}$ assume unit A/m. $R_n$ denotes the radius of the $n^{th}$ layer; $J_e$ denotes the overall $J_c$ of the $n^{th}$ layer; $t_{an}$ denotes the depth of the $n^{th}$ layer to which a magnetic field penetrates when viewed from the outside; and $t_{bn}$ denotes the depth of the $n^{th}$ layer to which a magnetic field penetrates when viewed from the inside. Further, $W_n$ assumes unit W/m, and $H_{opn}$ and $I_{opn}$ assume unit A/m.

An eddy current loss $W_{f,e}$ of a core material is computed through use of Eq. 15.

$$W_{f,e} = \frac{\pi \rho \omega^2 \mu_0^2 R_f^3 d}{4\rho^2 + \omega^2 \mu_0^2 R_f^2 d^2} H_{ao}^2 \quad \text{Eq. 15}$$

Eq. 15 is described on, for example, pg. 41 of "Case Studies in Superconducting Magnets" (PLENUM PUBLISHING Co.). Here, $\rho$ denotes the specific resistance of the core material (@77K); $R_f$ denotes the outer radius of the core material; "d" denotes the thickness of the core material; and $H_{ao}$ denotes an axial magnetic field of the core material.

On the basis of the foregoing concept, there was prepared a simulation code to be used for analyzing a system through computation of the magnetic field of the conductor and the AC loss of the same. The thus-prepared simulation code was installed in a computer, thereby constituting an analyzer.

Figure 4:
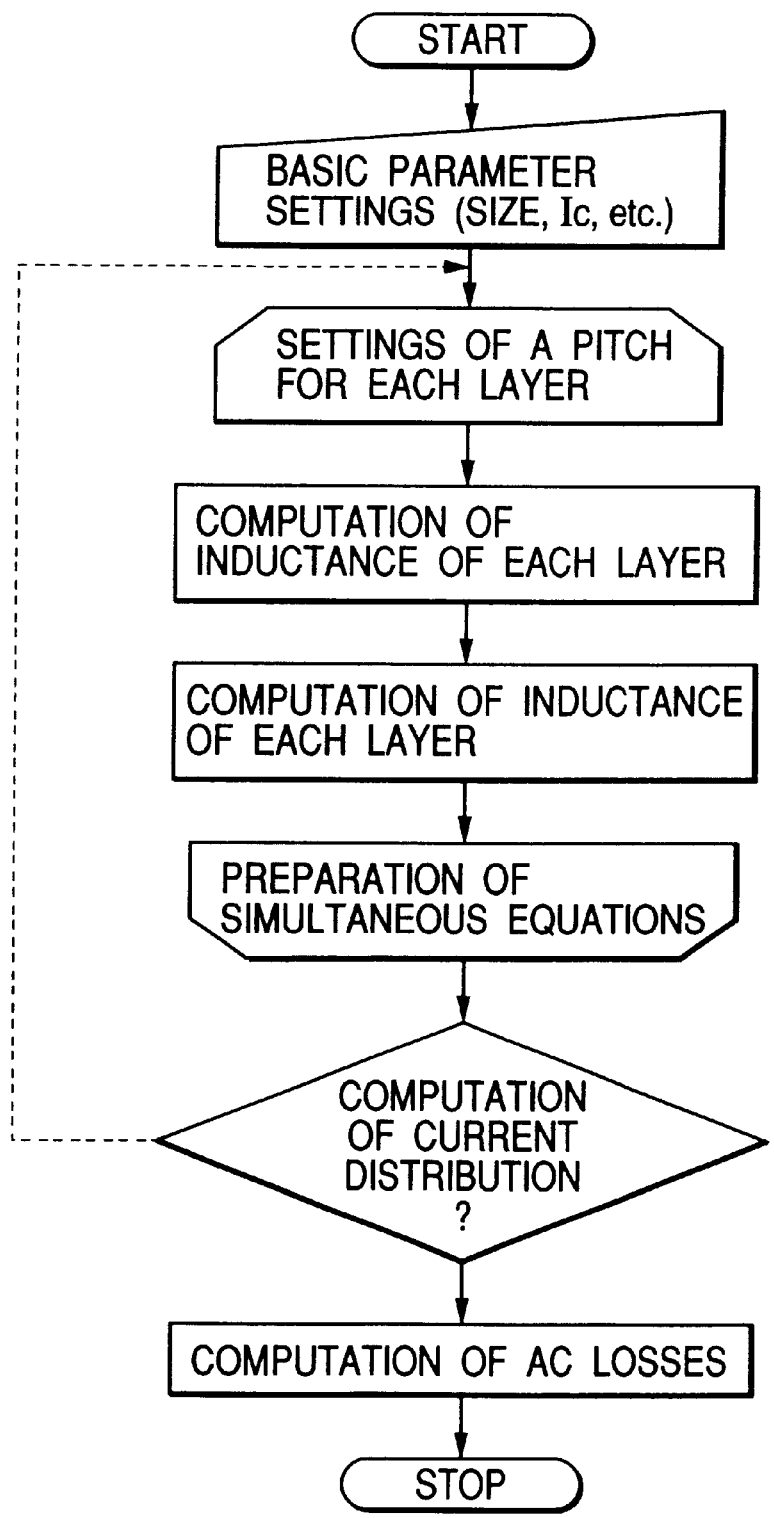
FIG. 4 is a flowchart showing procedures for evaluating an AC loss arising in the superconducting cable.

FIG. 4 shows a computation flow based on the simulation code. Computation procedures are as designated by steps (1) through (5). A return from a "computation of current distribution" step to a step of "setting of a pitch for each layer" represents iteration of computation until a difference between computation results before and after computation becomes equal to or less than a given value.

(1) Basic parameter settings: specifications of a wire (width, thickness, and Ic); specifications of a core material (specific resistance, outer diameter, and thickness); specifications of a conductor (the winding direction of each layer, the outer diameter of each layer, the thickness of each layer, and the Ic maintenance factor of each layer); and energizing requirements (an electric current supplied, and the frequency of the electric current);

(2) Entry of a pitch for each layer;

(3) Computation of inductance and effective resistance of each layer;

(4) Preparation of simultaneous equations, and computation of an electric current flowing through each layer; and (5) Computation of magnetic field distribution from the thus-computed current distribution, and computation of AC losses of a conductor.

Test Example 2

A pitch adjusted conductor having a magnetic shielding layer was designed and a prototype was constructed through use of the above-described analyzer. Further, the measurement result of AC loss was compared with the AC loss determined through a simulation. Specifications of a superconducting conductor are shown below. The pitch of the conductor layers and the pitch of the shielding layers were set to values at which the electric currents flowing through the respective superconducting layers become substantially uniform.

Core Material

Material: copper

Outer diameter: Φ19.2 mm

Thickness: 0.9 mm

Specific resistance (@77K): $3 \times 10^{-9}$ Ωm

Conductor Layer

Wire: high-temperature superconducting tape wire coated with Bi2223-based Ag—Mn alloy (having a thickness of 0.24 mm)

Number of layers: four (adjacent layers are insulated each other)

Winding direction: S/S/S/S

Winding pitch: 360 mm for the first layer, 200 mm for the second layer, 110 mm for the third layer, and 70 mm for the fourth layer Insulating Layer Material: paper Thickness: 7 mm Magnetic Shielding Layer Wire: high-temperature superconducting tape wire coated with Bi2223-based Ag—Mn alloy (having a thickness of 0.24 mm)

Number of layers: two

Winding direction: S/S

Winding pitch: 180 mm for the first layer, and 360 mm for the second layer

The result of a DC voltage application test shows that the conductor has an Ic of 2000A (defined at 1 $\mu$V/m).

Figure 5:
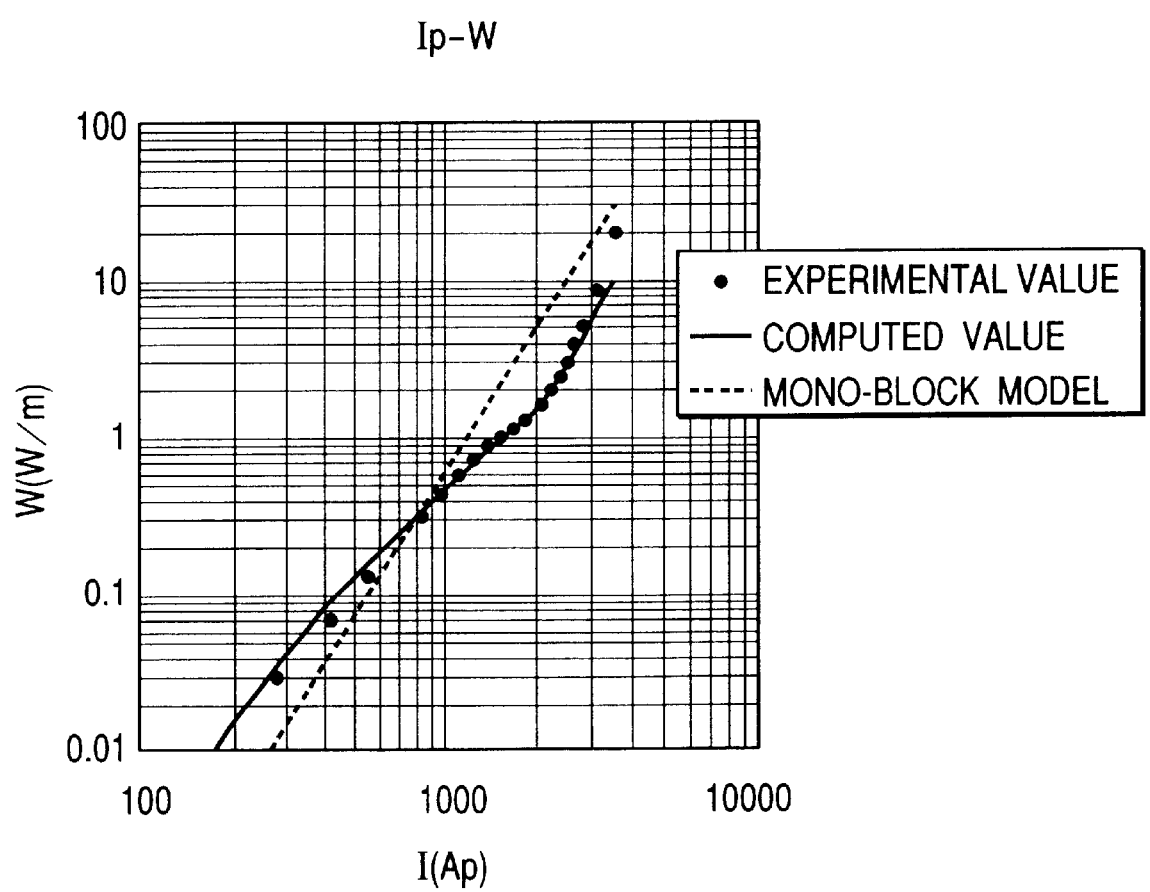
FIG. 5 is a graph showing a relationship between an electric current and an AC loss.

An AC loss of the conductor layer obtained by the test was compared with a computed AC loss. FIG. 5 shows comparison results. In the test, a shielding effect of the magnetic shielding layer was simulated, and the conductor layer and the magnetic shielding layer were connected in series with each other. In this state, an a.c. current was supplied to the conductor layer, and the voltage of the conductor layer was measured. The a.c. current has a frequency of 50 Hz, and the superconducting wire has a temperature of 77K. The voltage of the conductor layer was measured through use of soldered voltage terminals by means of an AC four-terminal method. An AC loss of the conductor layer can be estimated from the resistance voltage (which is in phase with the electric current flowing through the conductor layer) measured by the four-terminal method. As shown in FIG. 5, it was ascertained that the measured AC losses coincide very closely with the computed AC losses.

A broken line shown in FIG. 5 shows theoretical AC losses of a superconducting conductor determined from a mono-block model (which can be applied to a case where an electric current flows in the form of unbalanced current distribution). The measured AC losses deviate greatly from the broken line. It was ascertained that a conductor—for which a pitch is set through use of a simulation code such that electric currents flowing through respective layers are made uniform-actually suppresses occurrence of unbalanced current distribution.

In connection with the superconducting conductor, an electric current flowing through a wire was estimated by means of dividing, by the number of wires of each layer, the electric currents which flow through respective layers and are determined by the simulation code. In comparison with a case where an electric current flowing through a wire is made completely uniform ($I_{all}/n_c$), variations $\Delta$ in the current flowing through the conductor have reached a maximum of 20% (when 2000A flows through the superconducting conductor). That is, as variations $\Delta$ in the current flowing through the conductor is 20%, the occurrence of the unbalanced current distribution can be suppressed and therefore AC losses are reduced more than that of a pitch unadjusted conductor.

To suppress this variations $\Delta$, a pitch of the innermost layer (a first layer) is changed to 340 mm. In this condition, the variation $\Delta$ is suppressed to a maximum of 15%, and AC losses are further reduced almost 3% when 2000A flows through the superconducting conductor.

From the foregoing test results, it is understood that a superconducting wire is wound at the shortest pitch on the outermost conductor layer and is wound at the longest pitch on the innermost magnetic shielding layer.

On the basis of a prediction that AC losses would be reduced by means of reducing variations in current further, pitches of the superconducting conductor of test example 2 were re-examined. As a result, it turned out that variations $\Delta$ in the current of the conductor are minimized on condition (minimum condition) that pitches of conductor layers are set 420 mm/270 mm/140 mm/80 mm from an inner layer and that pitches of magnetic shielding layers are set 260 mm/560 mm from an inner layer.

Figure 6:
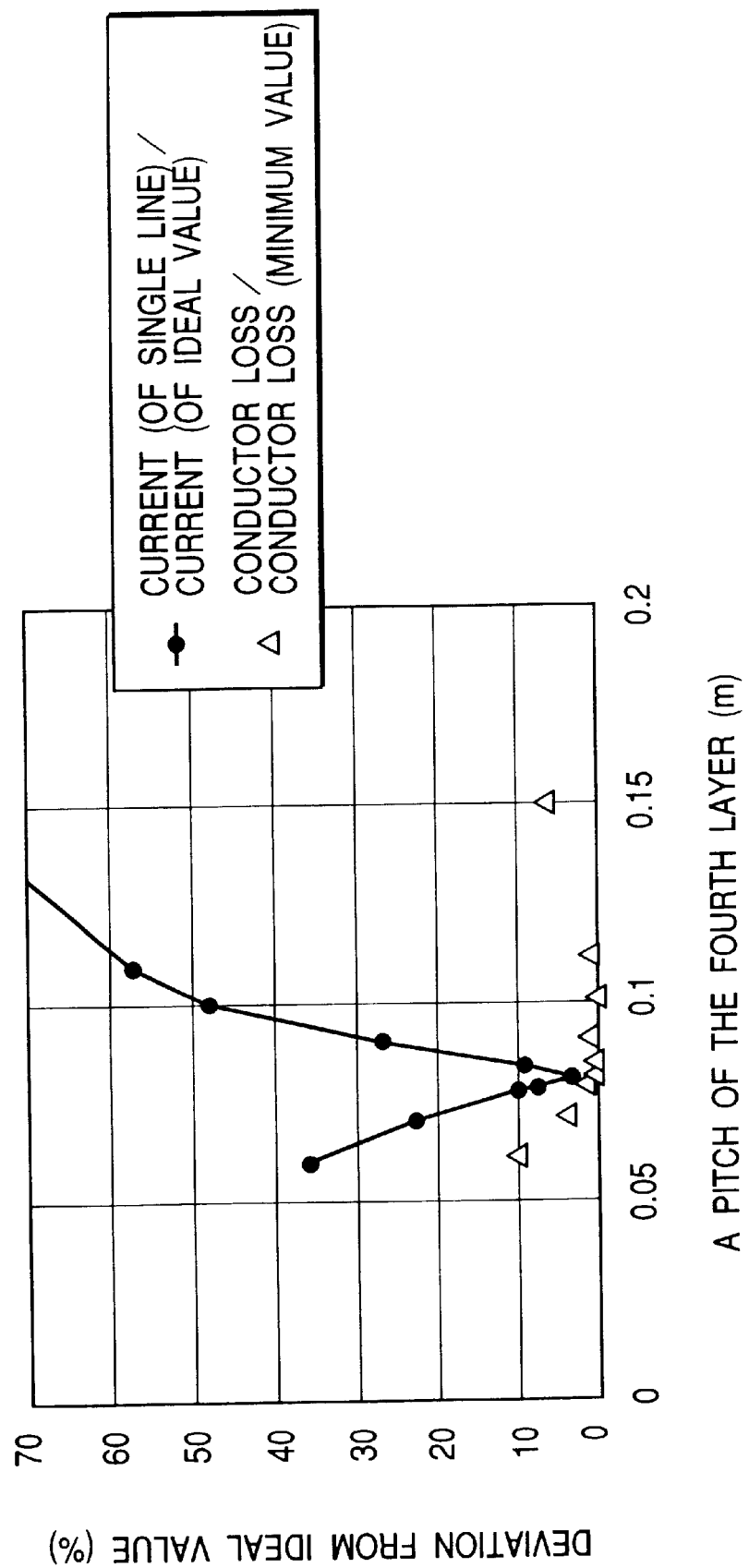
FIG. 6 is a graph showing a relationship between a pitch for the fourth conductor layer and a deviation Δ from an ideal pitch.

FIG. 6 shows a relationship between a pitch and the maximum variation $\Delta$ when the pitch of only the fourth conductor layer is changed from the pitch defined as the minimum condition, as well as showing a relationship between a pitch and an AC loss (standardized by the minimum AC loss). As indicated by a graph, the electric current flowing through the wire is not made completely uniform. It is ascertained that, if the maximum variation $\Delta$ from an ideal value of electric current flowing through a wire falls within a range of 5% or less, the minimum AC loss can be selected.

Test Example 3

In test example 2, it was ascertained that the computed AC losses of the conductor designed through use of the analyzer coincide very closely with measured AC losses. The conductor has a shortest pitch of 70 mm, and Ic of wire material of the conductor is deteriorated by deflection of the layer when the wires are wound. As a result, the Ic maintenance power of the fourth conductor layer is deteriorated until it becomes lower than an ideal Ic of a conductor. Specific means for causing a simulation code to allow for such an effect may be embodied in the form of "Ic maintenance power of each layer," as mentioned previously. Consideration can be given to the effect of reducing IC maintenance power, by means of setting a critical current of a superconducting wire for each layer during a process of inputting a critical current of a superconducting wire into the simulation code. This method can be advantageously applied to a case where an Ic of each of layers is changed by means of a factor other than mechanical distortion of the superconducting cable.

Deflection $\epsilon_a$ exerted on a tape wire material when the tape wire material is wound can be expressed in the form of Eq. 16, provided that a helically-winding pitch is taken as P and the outer diameter of a core material is taken as D. Accordingly, the only requirement is that the shortest pitch of the superconducting wire be set such that $\epsilon_c$ (a critical deflection of a superconducting wire)$>\epsilon_a$. The critical deflection $\epsilon_c$ is defined as a deflection at which a drop in Ic of the superconducting wire becomes noticeable. For instance, a deflection—at which a drop of 2% or more arises in Ic of a superconducting wire from Ic of an undeflected superconducting wire—is taken as a critical deflection $\epsilon_c$.

$$\varepsilon_a = \sqrt{\frac{P^2 + \pi^2(D+2t)^2}{P^2 + \pi^2(D+t)^2}} - 1 \qquad \text{Eq. 16}$$

Figure 7:
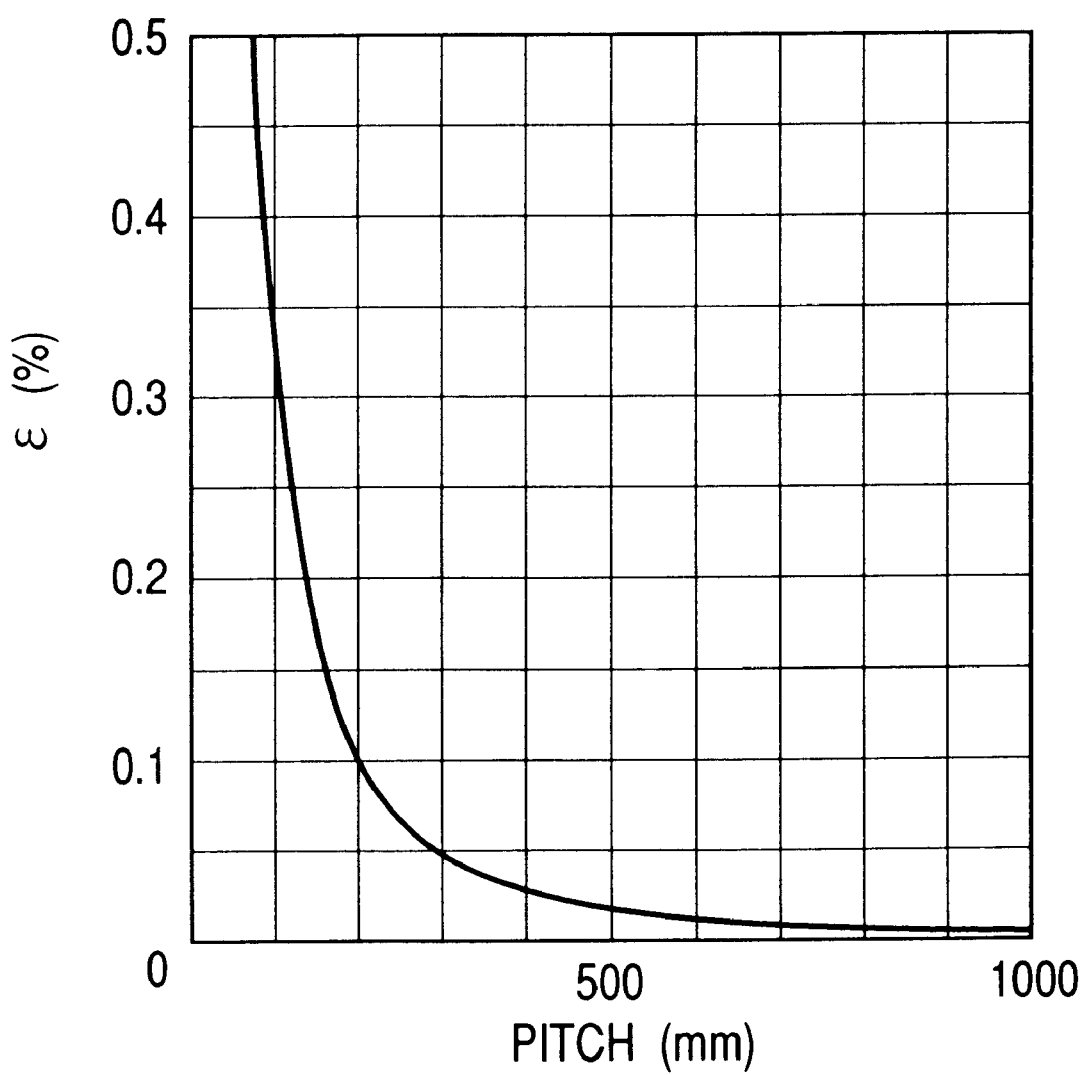
FIG. 7 is a graph showing a relationship between the pitch of a superconducting wire and a deflection thereof.

P: spirally-winding pitch
D: diameter of core material
T: thickness of a tape wire A relationship between a pitch and deflection is plotted, as shown in FIG. 7, through use of Eq. 16. The tape wire has a thickness of 0.24 mm and the core material has a size of $\phi$19.2 mm, as in the case of test example 2.

The tests which have been conducted so far show that a drop in Ic of a helically-wound superconducting wire can be prevented by means of setting deflection $\epsilon_a$ within a range of 0.3% or less in Eq. 16. An estimate based on FIG. 7 shows that a pitch for a conductor having specifications such as those described in connection with test example 2 must be set to a value of 100 mm or more. In this example, the critical deflection of the superconducting wire is set to 0.3%. Needless to say, the numerical value of the critical deflection may be determined in accordance with characteristics of a superconducting wire.

It has already been known that, in a case where the longest pitch of the conductor exceeds 600 mm, ruptures frequently arise in a superconducting conductor when the conductor is drawn and wound around a drum. The longest pitch can be determined as follows: Namely, the longest pitch is set such that the tension which is exerted on a superconducting wire during winding of a superconducting cable determined by Eq. 17 assumes a value under the rupture load of the superconducting wire.

*(Frictional force (kg/m)×the length (m) of a superconducting wire for a half pitch)+winding tension (kg)*      Eq. 17

A superconducting wire usually has a rupture load of 10 kg or thereabouts, a measured frictional force of 30 kg/m or thereabouts, and a winding tension of 1 kg or thereabouts. Hence, these values are substituted into Eq. 17, whereby a winding pitch is determined to assume a value of 600 mm. As a matter of course, the rupture load, frictional force, and winding tension of a superconducting wire vary in accordance with characteristics of the superconducting wire. Hence, values corresponding to the characteristics of the superconducting wire are employed.

A pitch adjusted conductor having magnetic shielding layers was designed and a prototype was constructed through use of the simulation code of test example 1 with additional conditions: that is, a shortest pitch of 100 mm or more and a longest pitch of 600 mm or less. Results of measurement of AC loss and the AC loss determined through the simulation were compared with each other. Specifications of the conductor are as follows: A fiber reinforced plastic (FRP) pipe which has much greater resistance than copper which was used as a core material. A pitch of the conductor layers and a pitch of the magnetic shielding layers were set such that electric currents flowing through the respective superconducting layers become uniform.

Core Material

Material: FRP pipe

Outer diameter: Φ19.2 mm

Thickness: 0.9 mm

Conductor Layer

Wire: high-temperature superconducting tape wire coated with Bi2223-based Ag—Mn alloy (having a thickness of 0.24 mm)

Number of layers: four (adjacent layers are insulated each other)

Winding direction: S/S/Z/Z

Winding pitch: 140 mm for the first layer, 320 mm for the second layer, 420 mm for the third layer, and 120 mm for the fourth layer Insulating Layer Material: paper Thickness: 7 mm Magnetic Shielding Layer Wire: high-temperature superconducting tape wire coated with Bi2223-based Ag—Mn alloy (having a thickness of 0.24 mm)

Number of layers: two

Winding direction: S/S

Winding pitch: 350 mm for the first layer, and 520 mm for the second layer

The result of a DC voltage application test shows that the conductor layer has an Ic of 2100A (defined for 1 $\mu$V/m). This Ic coincides with an Ic (2100A) of a conductor estimated from the Ic of an undeflected wire.

An measured AC loss of the conductor layer was compared with a computed AC loss. In the test, a shielding effect of the magnetic shielding layer was simulated, and the conductor layer and the magnetic shielding layer were connected in series. In this state, an a.c. current was supplied to the conductor layer, and the voltage of the conductor layer was measured. The a.c. current has a frequency of 50 Hz, and the superconducting wire has a temperature of 77K. The voltage of the conductor layer was measured through use of soldered voltage terminals by means of an AC four-terminal method. An AC loss of the conductor layer can be estimated from the resistance voltage (which is in phase with the electric current flowing through the conductor layer) measured by the four-terminal method.

The test result shows that the conductor encountered an AC loss of 0.5 W/m when an electric current of 1 kArms was supplied. It was ascertained that the AC loss coincides closely with an AC loss (of 0.47 W/m) estimated through use of the analyzer.

There can be constructed a superconducting cable which is superior in mechanical characteristic and does not induce a drop in critical current, by means of laying the outermost conductor layer at the shortest pitch in a superconducting wire, laying the outermost magnetic shielding layer at the longest pitch in the superconducting wire, setting the shortest pitch to a winding pitch at which a deflection assumes a value of 0.3% or less, and setting the longest pitch to a certain value (i.e., a value of 600 mm or less at which no rupture arises even when the superconducting cable is wound around a drum).

Figure 8:
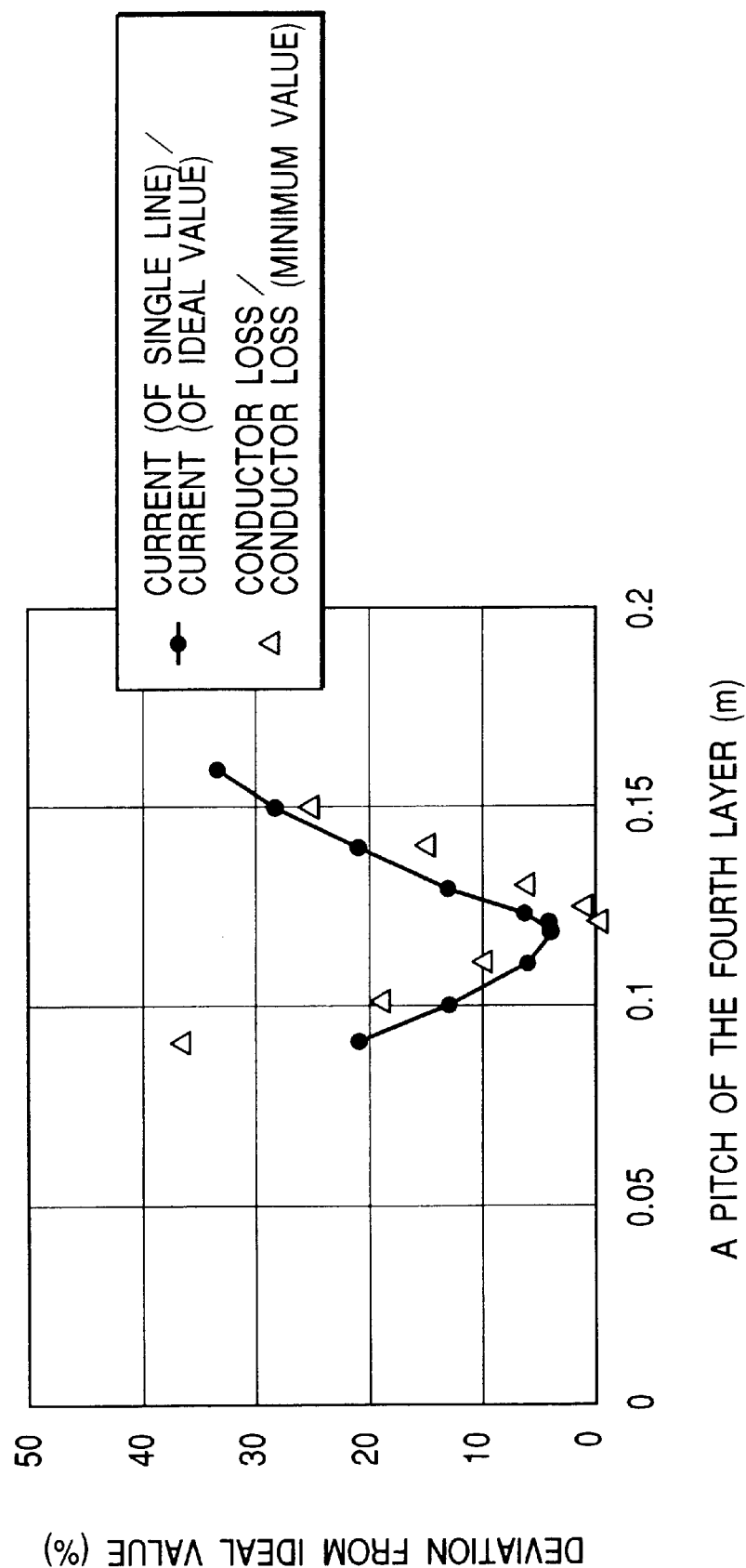
FIG. 8 is a graph showing a relationship between a pitch for the fourth conductor layer and a deviation Δ from an ideal pitch.

With regard to the conductor described in connection with test example 3, there was examined a relationship between a pitch and the maximum variation $\Delta$ when the pitch of only the fourth conductor layer is changed from the pitch defined as a manufacturing condition, as well as a relationship between a pitch and an AC loss (standardized by the minimum AC loss) The relationships are plotted in form of a graph in FIG. 8. As indicated by the graph, the electric current flowing through the wire is not made completely uniform. It is ascertained that, if the maximum variation $\Delta$ deviating from an ideal value of a wire falls within a range of 5% or less, the minimum AC loss can be selected.

Test Example 4

According to conventional theories, it has been considered that an AC loss of a conductor can be minimized when the current distribution of each of layers is made completely uniform. There has been checked the relationship between variations in the current distribution of each layer and the total amount of AC loss of the entire superconducting conductor, through use of the analyzer. The result of check shows that, even if the current value is not completely uniform, so long as the current value of the superconducting wire is made uniform, the AC loss becomes minimum and there can be embodied an AC loss identical with that obtained when the currents of layers are made uniform.

In a case where a pitch condition for making the electric currents of respective layers completely uniform does not square with reality in terms of the mechanical characteristic of a wire material, the design of a superconducting cable may be changed such that there may be obtained a realistic pitch in terms of a mechanical characteristic. Although a slight imbalance may arise in currents of respective layers, AC losses can be suppressed to substantially the same level as that obtained when the current densities of layers are made uniform.

More specific analysis of a three-phase superconducting cable (for one phase of the cable) was performed by means of subtly changing only winding pitches, to thereby subtly change the current distribution within each layer and the current within each superconducting wire. Here, the three-phase superconducting cable comprises a conductive core (cooper), a conductor layer, an electrically insulating layer, and a superconducting magnetic shielding layer made of a two-layer superconducting wire, wherein the conductor layer is made up of four superconducting layers made by helically winding a plurality of superconducting wires on the conductive core.

If the current (absolute value) of the superconducting wire determined through analysis falls within a range of ±5% with reference to value $I_{all}/n_c$ obtained by means of dividing the current $I_{all}$, which is a predetermined value, by the number of wires "$n_c$," an AC loss assumes the minimum value. In contrast to changes in the AC loss arising when electric currents flowing through superconductor layers are made completely uniform, variations in AC loss are 10% or less. It turns out that, if variations in the absolute value of electric current flowing through the superconducting wire become greater, an AC loss will increase sharply as compared with variations in an AC loss which arises when electric currents flowing through superconductor layers are made completely uniform. An AC loss—which arises in the event of a slight imbalance occurring in the electric currents flowing through respective layers—will become equal to an AC loss—which arises when electric currents flowing through superconductor layers are made completely uniform—so long as the pitches of respective superconducting wires including magnetic shielding layers are set such that electric currents of the superconducting wires fall within a range of ±5% with reference to the value $I_{all}/n_c$ obtained by means of dividing the current $I_{all}$ by the number of wires "$n_c$".

Published Japanese National Stage of International Application No. Hei. 11-506261 describes a technique pertaining to common pitch requirements for making uniform an electric current of a superconducting cable which is of multilayer construction and has a magnetic shielding layer. It has been discovered that the current distribution within the superconducting cable can be made uniform with a pitch failing to comply with a conditional expression proposed in the publication, so long as the pitch of a superconducting wire including a magnetic shielding layer is set such that an electric current of the superconducting wire falls within a range of ±5% with reference to the value $I_{all}/n_c$ obtained by means of dividing the current $I_{all}$ by the number of wires "$n_c$".

Test Example 5

Requirements for making uniform electric currents flowing through a superconducting conductor having an increased number of layers were examined through use of a simulation code. Table 1 shows specifications of a superconducting wire subjected to computation.

TABLE 1

PARAMETERS OF SUPERCONDUCTING WIRE

| WIRE | THICKNESS | 0.24 mm |
|---|---|---|
|  | WIDTH | 3.5 mm |
|  | Ic/WIRE @77K, 0T | 50 A |
|  | Je | 6000 A/cm² |

A superconducting conductor was formed from the superconducting wire so as to comprise, in sequence from the innermost layer, a core material, a conductor layer, an insulating layer, and a magnetic shielding layer. A pitch at which electric currents of the wires are made uniform was computed. Table 2 provides specifications of the superconducting conductor.

TABLE 2

CONSTRUCTION OF SUPERCONDUCTING CONDUCTOR

| CORE MATERIAL | CONSTRUCTION | SOLID COPPER STRANDED CONSTRUCTION (A DIAMETER OF 20 mm) |
|---|---|---|
|  | SIZE OF COPPER WIRE | φ1 mm (insulation of a wire) |
| CONDUCTOR | OUTER DIAMETER OF CONDUCTOR LAYER | 28 mm |
|  | THICKNESS OF INSULATION LAYER | 6 mm |
|  | OUTER DIAMETER OF SHIELDING LAYER | 44 mm |
|  | NUMBER OF CONDUCTOR LAYERS | 8 LAYERS |
|  | NUMBER OF SHIELDING LAYERS | 4 LAYERS |
|  | WINDING DIRECTION (CONDUCTOR LAYER/SHIELDING LAYER) | SSSSSSSS/ZZZZ |

With regard to such a superconducting conductor, there were not found any pitch requirements at which variations in $I_{all}/n_c$ within a range of 5%. As a result of examination of requirements for reducing AC losses, there were found pitch requirements for minimizing AC losses. Table 3 shows the pitch requirements.

TABLE 3

| PITCH | | |
|---|---|---|
| CONDUCTOR LAYER | FIRST LAYER | +480 mm |
|  | SECOND LAYER | +460 mm |
|  | THIRD LAYER | +390 mm |
|  | FOURTH LAYER | +320 mm |
|  | FIFTH LAYER | +260 mm |
|  | SIXTH LAYER | +210 mm |
|  | SEVENTH LAYER | +170 mm |
|  | EIGHTH LAYER | +140 mm |
| SHIELDING LAYER | FIRST LAYER | −310 mm |
|  | SECOND LAYER | −380 mm |
|  | THIRD LAYER | −440 mm |
|  | FOURTH LAYER | −480 mm |

Figure 9:
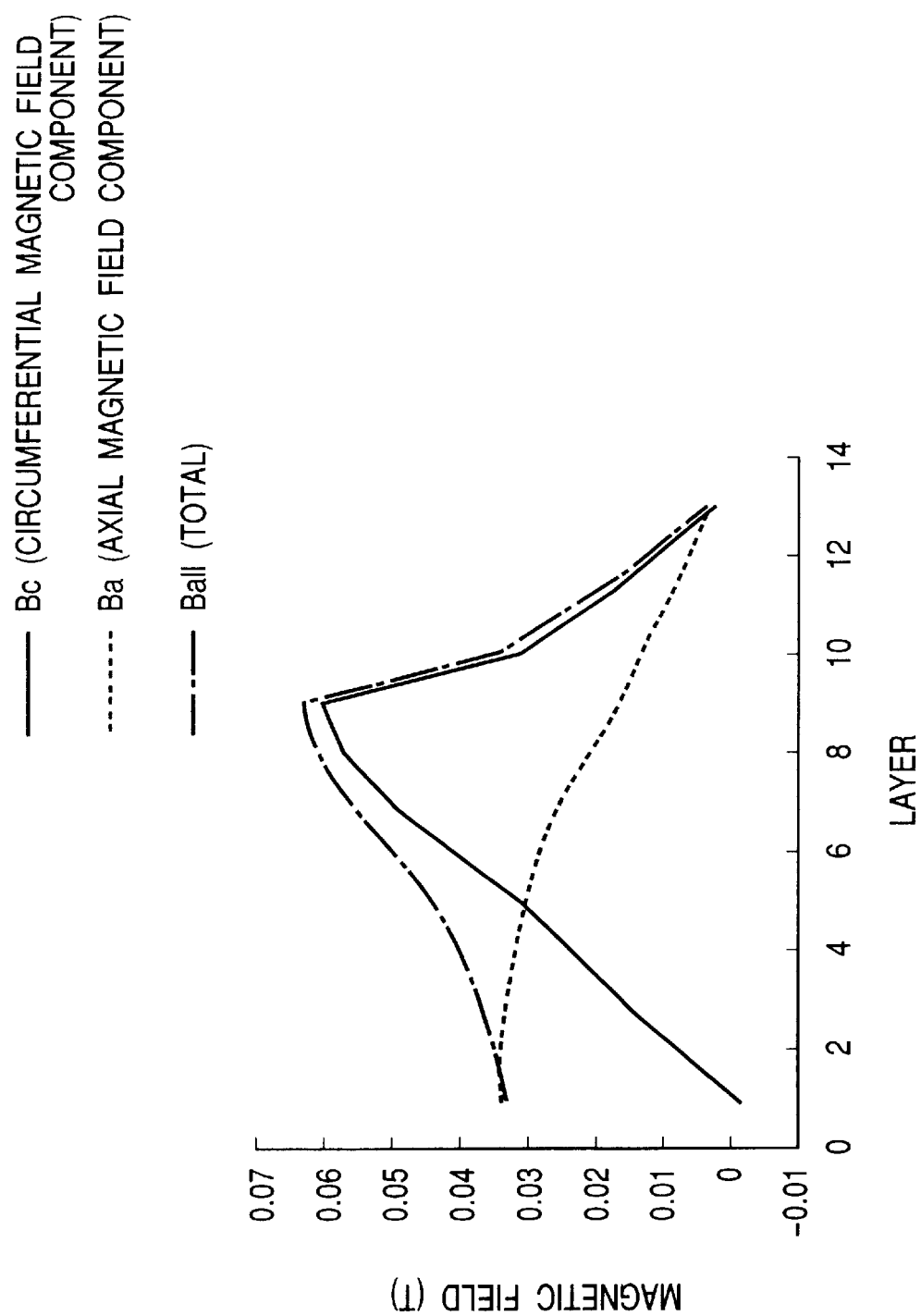
FIG. 9 is a graph showing magnetic field distribution of each of layers.

Under these requirements, AC losses arising in conductor layers and AC losses arising in shielding layers are estimated as 2.8 W/m in total. The magnetic field distributions of respective layers are plotted as shown in FIG. 9. The graph shows circumferential magnetic field components (Bc), axial magnetic field components (Ba), and total magnetic field components (Ball). The magnetic field distribution is characterized by the circumferential magnetic field component being distributed so as to assume only one maximal value when viewed from an inner layer to an outer layer and that the axial magnetic field component assumes the pattern of monotonously-decreasing distribution when viewed from an inner layer to an outer layer.

Figure 10:
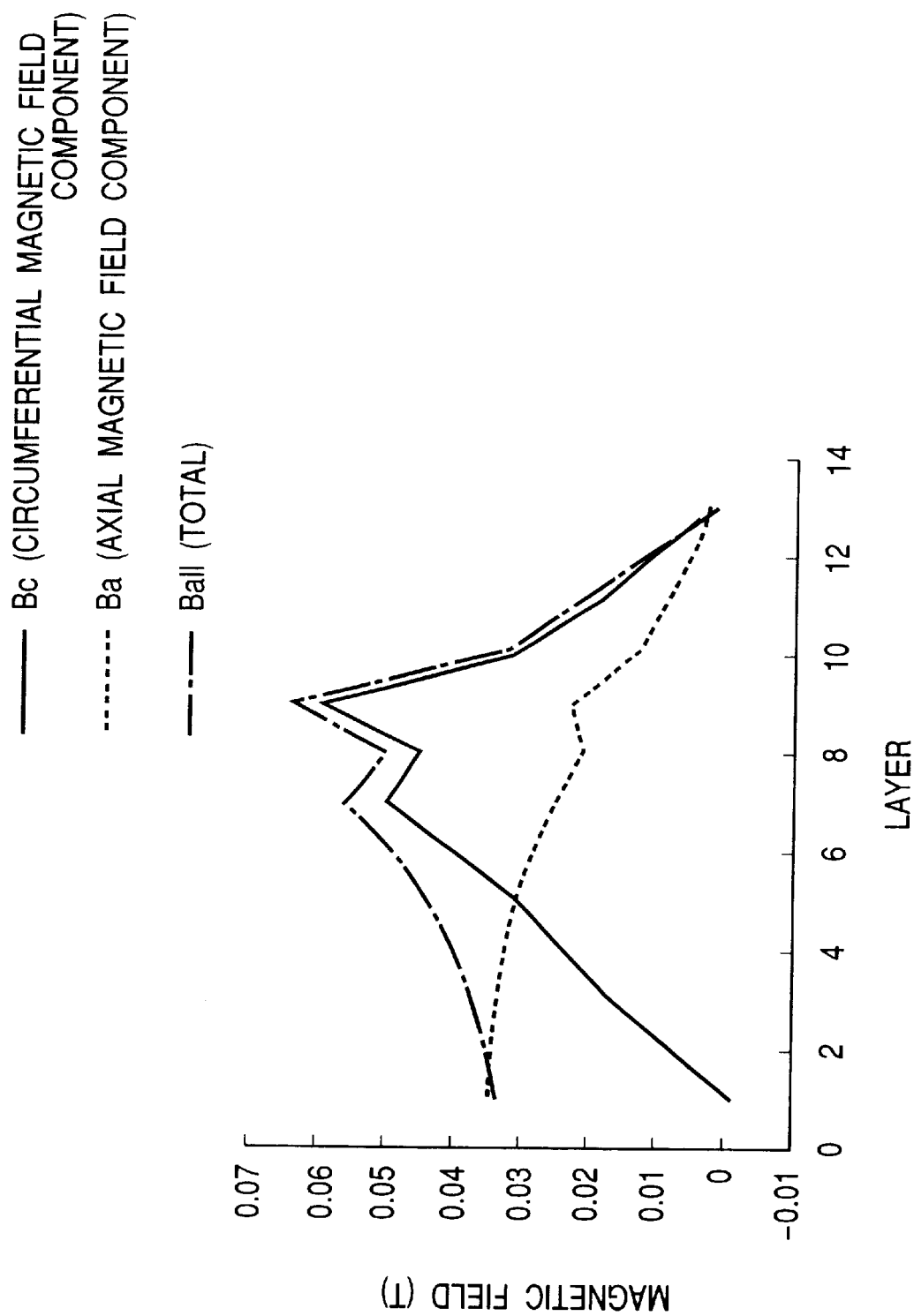
FIG. 10 is a graph showing magnetic field distribution of each of layers when a pitch at which the superconducting wire is to be wound around the outermost conductor layer is set to 150 mm.

If the pitch of the eighth conductor layer provided in Table 3 is changed by +10 mm to 150 mm, the AC loss will increase to 3.0 W/m. The magnetic field distribution within the eighth conductor layer is shown in FIG. 10. If the pitch of the eighth conductor layer provided in Table 3 is changed to 130 mm by −10 mm, the AC loss will increase to 3.2 W/m. The magnetic field distribution within the eighth conductor layer is shown in FIG. 11.

As shown in FIG. 10, with use of a pitch (150 mm) at which the AC loss deviates from the minimal value, two maximal values appear in the circumferential magnetic field component (Bc), and the axial magnetic field distribution (Ba) does not assume the pattern of monotonously-decreasing distribution. As shown in FIG. 11, with use of a pitch (130 mm) at which the AC loss deviates from the minimal value, one maximal values appear in the circumferential magnetic field component (Bc), and the axial magnetic field distribution (Ba) does not assume the pattern of monotonously-decreasing distribution.

So long as the pitch of each of the conductor layers is adjusted while the pattern of magnetic field is taken as a guide, there can be provided a superconducting conductor whose pitches are set so as to diminish AC losses even if variations in $I_{all}/n_c$ do not fall within a range of 5% (i.e., there are a large number of ayers).

Next, the pitches of the superconducting conductor provided in Table 3 were examined. As a result, when the pitch of the first layer of the conductor layer is changed to 500 mm by +20 mm, the AC loss increased. When the pitch of the fourth layer of the shielding layer change to 460 mm by −20 mm, the AC loss increased. Therefore, it is understood that if the pitch of the innermost layer of the conductor layer is set to be lager than the pitch of the outermost layer of the shielding layer, the AC loss would increase. That is, if the pitch of the outermost layer of the shielding layer is set to be longest, the AC loss will be reduced.

A superconducting cable and a method of analyzing current distribution of the superconducting cable according to the present invention are not limited to the specific examples set forth. As a matter of course, the examples may be subjected to various modifications within the scope of the invention.

As has been described above, there have been analyzed in detail the current distribution and AC loss of a superconducting cable, in which a core material has arbitrary resistance, a conductor is of arbitrary size, and an arbitrary helical winding direction and arbitrary pitches. As a result of analysis, a superconducting cable according to the present invention enables realization of a construction involving smaller AC losses. The shortest pitch of a superconducting wire is set from the viewpoint of deflection, and the longest pitch of the superconducting wire is set from the viewpoint of tensile strength. As a result, there can be constructed a superconducting cable which has a high critical current and induces a small AC loss.

Further, as has been described above, the method according to the present invention enables detailed analysis of the current distribution and AC loss within a superconducting cable, in which a core material has arbitrary resistance, a conductor is of arbitrary size, and an arbitrary helical winding direction and arbitrary pitches. Further, the method enables analysis of a superconducting cable having a core material, conductor layers, and magnetic shielding layers. Analysis methods according to a related art enable prediction in only typical cases, such as (1) prediction of an AC loss arising when electric currents flowing through conductor layers are made uniform theoretically or (2) prediction of a current distribution or AC losses when superconducting wires of a layer act as if they were electrically and completely coupled together. Particularly, prediction of an AC loss taking into consideration the resistance and impedance of a core material has not yet been reported. The present invention enables correct analysis of an AC loss allowing for the resistance and impedance of a core material. Hence, the present invention can be effectively utilized for designing a superconducting cable which can minimize an AC loss.

What is claimed is:

1. A superconducting cable comprising:
   a core material;
   at least one conductor layer including superconducting wires helically wound around the core material at a first pitch;
   an electrically insulating layer formed on the conductor layer; and
   at least one magnetic shielding layer including superconducting wires helically wound around the electrically insulating layer at a second pitch,
   wherein the first pitch of the conductor layer and the second pitch of the magnetic shielding layer are set on the basis of electric currents flowing through the superconducting wires of the conductor layer and the magnetic shielding layer analyzed by a process comprising:
   (1) modeling the core material, the conductor layer, and the magnetic shielding layer as a circuit at least an induced reactance;
   (2) inputting parameters including specifications of the core material including a size and a specific resistance thereof, specifications of the superconducting wire including a critical current and a size thereof, specifications of the conductor layer including a winding direction and the first pitch at which the superconducting wires are to be helically wound, a thickness and an outer diameter of the conductor layer, and the number of conductor layers, and a frequency and an electric current to be supplied;
   (3) computing an inductance and an effective resistance of the circuit on the basis of thus inputted parameters; and
   (4) preparing a circuit formula on the basis of the circuit and computing a current distribution of each of the layers.

2. The superconducting cable according to claim 1, wherein the process further comprises:
   (5) analyzing the electric currents flowing through superconducting wires of the conductor layer,
   wherein the first pitch of the conductor layer and the second pitch of the magnetic shielding layer are set such that an absolute value of thus analyzed electric current falls within a range of ±20% with reference to a value $I_{all}/n_c$ obtained by means of dividing a current $I_{all}$ which is provided to the conductor layer with a predetermined value, by the number of superconducting wires "$n_c$" of the conductor layer.

3. The superconducting cable according to claim 2, wherein the first pitch of the conductor layer and the second pitch of the magnetic shielding layer are set such that the absolute value of thus analyzed electric current falls within a range of ±5% with reference to the value $I_{all}/n_c$.

4. The superconducting cable according to claim 1, wherein the process comprising:
   (6) analyzing a circumferential magnetic field component and an axial magnetic field component of each of layers on the basis of the computed current distribution of each of layers,
   wherein the first pitch of the conductor layer and the second pitch of the magnetic shielding layer are set such that the circumferential magnetic field component has only one maximal value when viewed from an inner layer to an outer layer of the superconducting cable and that the axial magnetic field component has monotonously-decreasing distribution when viewed from the inner layer to the outer layer.

5. A superconducting cable comprising:
   a core material;
   at least one conductor layer including superconducting wires helically wound around the core material;
   an electrically insulating layer formed on the conductor layer; and
   at least one magnetic shielding layer including superconducting wires helically wound around the electrically insulating layer,
   wherein the superconducting wire of an outermost conductor layer is wound at the shortest pitch and the superconducting wire of an outermost magnetic shielding layer is wound at the longest pitch.

6. The superconducting cable according to claim 5, wherein the shortest pitch of the superconducting wire of the outermost conductor layer satisfies the following equation:

$$\varepsilon_c = \sqrt{\frac{P^2 + (\pi^2(D_{n-1} + 2t))^2}{P^2 + (\pi^2(D_{n-1} + t))^2}} - 1$$

where $\varepsilon_c$ denotes a critical deflection of the superconducting wire; $P_n$ denotes a pitch (m) at which the superconducting wire of the $n^{th}$ layer is to be wound; "t" denotes a thickness (m) of the superconducting wire; and $D_n$ denotes an outer diameter (m) of the $n^{th}$ layer.

7. The superconducting cable according to claim 6, wherein the longest pitch of the superconducting wire of the outermost magnetic shielding layer satisfies the following equation:

Rupture load of the superconducting wire>(a frictional force (kg/m)×a length (m) of the superconducting wire for a half pitch)+a tensile force for winding (kg).

8. A method of analyzing a current distribution within a superconducting cable including a core material, at least one conductor layer including superconducting wires helically wound around the core material, and electrically insulating layers formed on the conductor layer, the method comprising:

(1) modeling the core material and the conductor layer as a circuit including at least an induced reactance;

(2) inputting parameters including specifications of the core material including a size and a specific resistance thereof, specifications of the superconducting wires, specifications of the conductor layer including a winding direction and a pitch at which the superconducting wires are to be helically wound, a thickness and an outer diameter of the conductor layer, and the number of the conductor layer, and a frequency and an electric current to be supplied;

(3) computing an inductance and an effective resistance of the circuit on the based on thus inputted parameters; and (4) preparing a circuit formula on the basis of the circuit and computing a current distribution of each of layers.

9. The method of analyzing the current distribution according to claim 8, wherein the superconducting cable has at least one magnetic shielding layer including superconducting wires helically wound the electrically insulating layer, the magnetic shielding layer being modeled as a circuit including at least an induced reactance in step (1), the number of the magnetic shielding layer being inputted in step (2).

10. The method of analyzing the current distribution according to claim 9, wherein adjacent layers of the conductor layers and the magnetic shielding layers each having the superconducting wires are electrically insulated each other.

11. The method of analyzing the current distribution according to claim 9, wherein, in step (1), the core material and the conductor layer are deemed a concentrated-constant circuit including an induced reactance connected in series with a resistance; the magnetic shielding layer is deemed a closed circuit loop formed by means of interconnecting the magnetic shielding layers by way of a resistor provided at a terminal thereof; the conductor layer and a power supply connected thereto are deemed a primary circuit; and the magnetic shielding layer and the resistor provided at the terminal thereof are deemed a secondary circuit, the primary circuit and the secondary circuit forming a mutual-induction circuit.

12. The method of analyzing the current distribution according to claim 11, wherein the resistance of the concentrated-constant circuit is changed by an electric current flowing through the conductor layer.

13. The method of analyzing the current distribution according to claim 11, wherein an effective resistance $R_{\mathit{eff}}$ of the superconducting wire is defined as $R_{\mathit{eff}}=W_{layer}/I^2$ in terms of an AC loss $W_{layer}$ of each of the layers and an electric current I flowing through each of the layers, and $R_{\mathit{eff}}$ is deemed the resistance of the concentrated-constant circuit.

14. The method of analyzing the current distribution according to claim 13, wherein the AC loss $W_{layer}$ is computed from an AC current-loss characteristic of the superconducting wire.

15. The method of analyzing the current distribution according to claim 8, wherein in step (1), the core material and the conductor layer are modeled as the circuit including the induced reactance and a resistor.

16. The method of analyzing the current distribution according to claim 8, further comprising:

(5) computing a magnetic field distribution and an AC loss of the superconducting cable from the computed current distribution.

17. The method of analyzing the current distribution according to claim 8, wherein in step (2), an appropriate initial value is inputted as the electric current of each of the layers, then the current distribution of each of the layers is computed from the initial value, and thus computed electric current is used as the parameter in step (2), wherein step (2) through step (4) are repeated until a difference in the electric current of each of the layers before computation and the electric current of each of layers after computation falls within a desired range.

18. The method of analyzing the current distribution according to claim 17, wherein the desired range is to fall is 10% or less.

19. The method of analyzing the current distribution according to claim 8, wherein a critical current and a size of the superconducting wire are set for each of the layers in step (2).

* * * * *